United States Patent Office 2,863,211
Patented Dec. 9, 1958

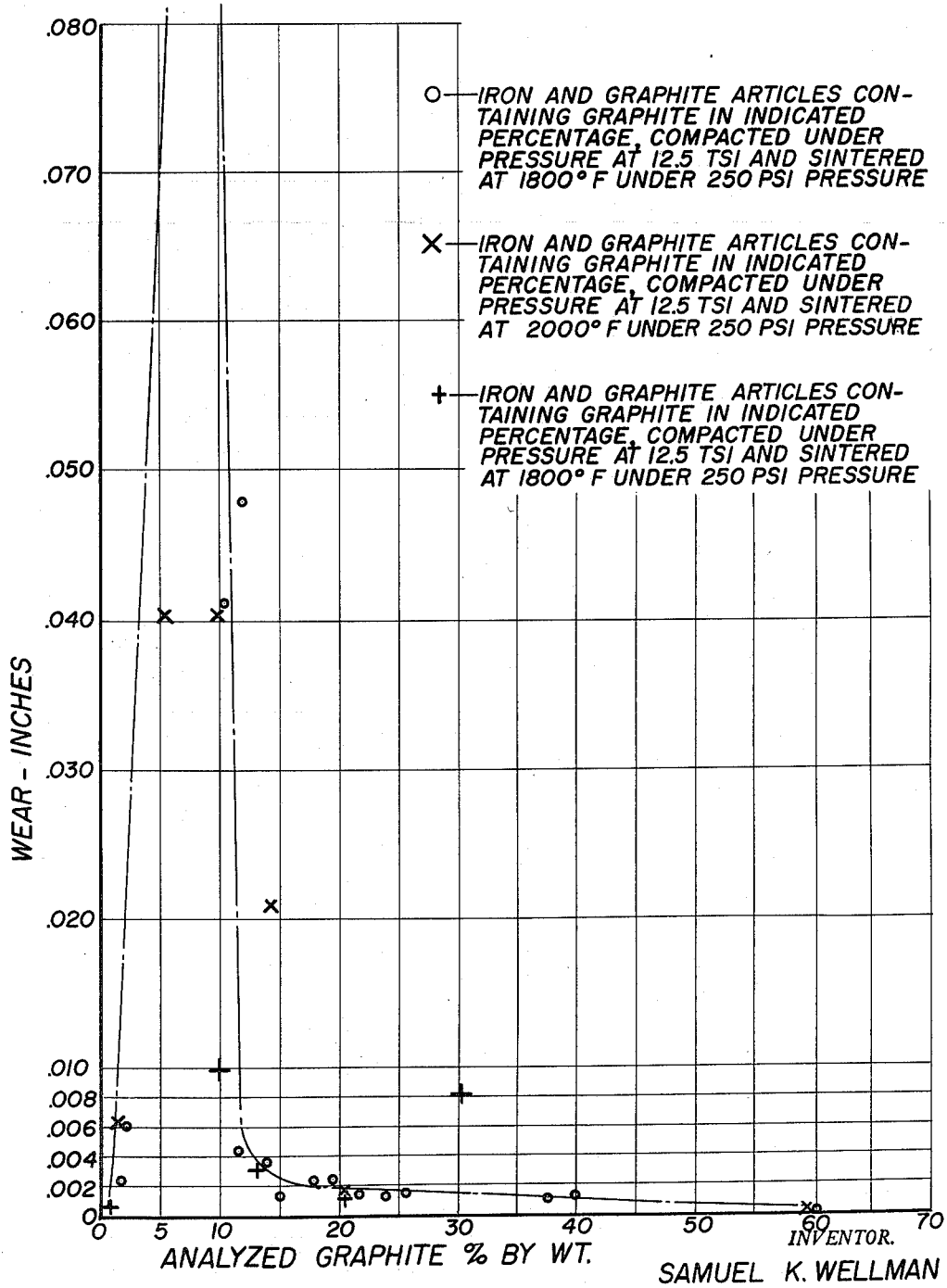

2,863,211

FRICTION ASSEMBLY

Samuel K. Wellman, Cleveland Heights, Ohio, assignor to The S. K. Wellman Company, Bedford, Ohio, a corporation of Ohio Application November 29, 1955, Serial No. 549,727

3 Claims. (Cl. 29—182.3)

This invention relates to a new friction assembly for vehicular and industrial use, and is a continuation in part of the pending application of Samuel K. Wellman and Chester A. Bielawski, Serial No. 421,778, filed April 8, 1954 now abandoned. More particularly, the present invention relates to a friction assembly which includes a compressed and sintered friction material, which provides between the moving members a continuously-renewing graphitic film or films on which, or between which, relative motion and contact between the two members takes place. The film tends to prevent metal to metal contact between the metallic elements in the two members, with a resulting operation which is smoother and freer of galling and seizure.

Those experienced in this art accept the theory that the area of contact between two member rubbing against each other is but a fraction of the entire area, and that this area of actual contact is continually shifting from one instant to another during the action. Therefore, while the film may not cover the entire surface of the two members, it is quickly established on the actual contact areas and continues to be formed and reformed and renewed on these areas, and the successor areas, as the rubbing action proceeds.

Friction materials used for linings or fracings in brakes, clutches, automotive transmissions and the like, must be selected and compounded with many factors in mind if customer acceptance and satisfactory operation are to be assured. These factors include (1) high coefficient of friction; (2) low wear of the lining and the surface which it engages; (3) absence of "fading" (decrease of coefficient of friction, e. g., due to a rapid succession of high speed stops resulting in an increase in temperature of the lining and mating surface, or due to the presence of oil, grease, moisture, or other foreign matter); (4) quietness of the operation of the material; (5) freedom from "grabbing" and erratic operation; and (6) cost of the materials and of their compounding.

Particularly for road vehicle brake applications, there has been a long search for a satisfactory friction material. The most common type of brake lining for passenger automobiles has been a non-metallic material, such as asbestos, with a binder of plastic, but this material, while relatively low in cost, has certain deficiencies, particularly in respect to excessive wear, a tendency to "fade" under certain conditions, and failure at high temperatures due to the disintegration of the asbestos and decomposition of the plastic.

Sintered, predominantly metallic friction facings made from powders have been used for many years, particularly in heavy-duty applications such as trucks, buses, military vehicles, airplanes, and industrial machinery, but these facings have exhibited certain drawbacks and have not met all of the rigid requirements for a satisfactory friction material.

It is an object of the present invention to provide a novel friction material which satisfies these long-known requirements.

The single figure of the accompanying drawing shows by a graph the results of wear tests. The test results are also set forth in tables hereinafter.

The role of powder metallurgy in the production of sintered friction facing materials is old and well known. The process, generally, has consisted of (1) preparing a mix containing predetermined amounts of metallic and non-metallic powders; (2) compressing the powdered mixture to form a briquette; and (3) heating the briquette at the sintering temperature of the predominant metallic powder, which is thereby formed into a porous matrix or network throughout which the non-metals are disposed.

Many different compositions of metallic and non-metallic powders have heretofore been employed in the manufacture of such sintered friction materials. However, it has always been believed that a predominantly metallic composition must necessarily be used to make the sintered product strong enough for use in a friction article. It has also been thought that other specific properties regarded as desirable in the finished friction article could best be supplied by including in the powdered mixture certain metals which, in a sintered condition, were known to possess the particular properties desired.

Typical in these respects of the various compositions heretofore used is that referred to in U. S. Patent No. 2,607,245, issued to the applicant Wellman on August 19, 1952, which contains four metallic powders (copper, tin, lead and iron) and two nonmetallic powders (silica and graphite), the metals comprising 88½% and the non-metals but 11½% by weight of the total mixture.

Copper was used as the basic metal in this particular mix both because of its heat conducting properties and its resistance to oxidation. Tin was included to add strength to the metallic matrix or network by substantially alloying with the copper during sintering. Iron was used to give the finished material a higher coefficient of friction; and lead, a metallic lubricant, to prevent jerking or grabbing in operation. The silica was included for its abrasive, friction-producing qualities, and the graphite was added as a lubricant to provide a smooth rubbing action.

Since graphite was thought to function as a non-metallic lubricant, it has heretofore been the general belief among powder metallurgists that powdered graphite could not be used in an amount in excess of about 10% by weight of the total powdered mixture without imparting lubricating characteristics incompatible with the high coefficient of friction required in a material to be used in brake and clutch linings and related friction-developing articles. It was further thought that the addition of more than 10% of graphite or carbon would prevent sintering or result in a weakly sintered body.

Applicant, however, has discovered that, under certain conditions, graphite actually functions to maintain and stabilize the friction coefficient, and that a mixture containing only powdered iron and graphite—the latter in a percentage substantially higher than heretofore deemed permissible—will produce a sintered article having characteristics superior to any multimetallic sintered product heretofore known. This material contains graphite particles in such quantity that a graphite film is formed and maintained between its operative surface and the mating surface which it engages, through the rubbing action of the surfaces. This film serves not only to counteract excessive "fade," but also serves to protect the friction article's metallic sub-strata against undue wear. The result is a friction article which is superior to any such prior article of which applicant is aware, particularly in the combination of properties of low wear and reproducible coefficient of friction over extended ranges of temperature and rubbing speed, and yet can be produced and sold at a price competitive with conventional friction materials, Structurally, applicant's invention comprises two rubbing surfaces, coated with a graphitic film, one of the surfaces being a film-producing, substantially continuous network of sintered iron powder, within which network are disposed particles of graphite. The film is generated and maintained on the two rubbing surfaces by the inter-action of the surfaces through the comminution and smearing of the particles of graphite which are exposed on the surface of the network structure. In friction-producing assemblies such as brakes, clutches, automotive transmissions, and the like, the rubbing surfaces are engaged at a pressure of more than about 30 p. s. i. Brakes, such as in vehicles and aircraft, are operated at average pressures ranging from about 100 p. s. i. to about 300 p. s. i. Vehicular and industrial clutches are operated at average pressures from about 30 p. s. i. to about 100 p. s. i. Under such pressure, the particles of graphite which are exposed on the surface of the network are comminuted and smeared over the mating surfaces to form a substantially uninterrupted film or coating, separating the two surfaces.

While the film retards wear of the engaging surfaces, as is more fully pointed out hereafter, nevertheless, such wear as does occur on the network surface will cause the exposure of additional particles of graphite, which in turn will be comminuted and smeared over the surfaces by the rubbing action. Thus the film will be continuously renewed and maintained during the operating life of the friction assembly.

The network structure is produced by conventional methods of compressing and sintering a mixture containing two components, powdered iron and particles of graphite.

The powdered iron must be used in such quantity that there is a substantially continuous iron network or matrix, which provides sufficient strength for holding the entrapped graphite. As will be appreciated by those skilled in the art, the exact percentage by weight of the iron will depend upon particle size and shape, apparent density of the iron powder, pressure used in compacting the mix, sintering temperature, etc.

The term "iron powder" as used herein includes the various commercial powders as produced by the several manufacturers of iron powder. While the amount of carbon, oxygen, manganese and other impurities present in the powder affect its moldability, compressibility, "green" strength and sintering characteristics, it has been found that any of the commercial powders can be used. The best results have been obtained with a comparatively soft, low apparent density spongy powder because of the ease of molding and pressing and its greater "green" strength, but the harder and higher apparent density powders may also be used.

The graphite must be used in such quantity that there is progressively exposed on the network surface sufficient particles thereof to smear between the mating friction surfaces a substantially continuous graphitic film. The exact percentage by weight of the graphite to be included in the mixture will depend to some extent on the density and particle size of the iron powder used, but it is essential that a relatively high percentage be included to produce and maintain a graphitic film between the engaging friction surfaces.

I have discovered that not less than about 15% by weight of graphite must be included in order to produce the film under the rubbing pressures contemplated. With lower percentages of graphite, I have found that catastrophic wear results, due to the metal to metal contact between the rubbing surfaces and the absence of a substantially continuous graphitic film. With nominal amounts of graphite, i. e., less than about 2%, the wear rate is not excessive, which is undoubtedly due to the strength of the iron network, but such articles are lacking in the other necessary characteristics of a friction article. Successive increases in graphite up to about 15% by weight result in friction materials which wear excessively. However, articles made with a content of more than about 15% of graphite show a low wear rate, a reproducible coefficient of friction, and have other characteristics required of a satisfactory friction member.

Wear tests show the following results on specimens having the indicated percentages by weight of iron powder and graphite:

Test I

Pressing pressure—12.5 tons per square inch.
Sintering temperature—1800° F. at 250 lbs. per square inch pressure.

[With one type of iron powder.]

| Run | Nominal Composition | | Graphite By Analysis | Wear |
|---|---|---|---|---|
| | Graphite | Iron | | |
| 1 | 1 | 99 | 1.66 | .0024 |
| 2 | 2 | 98 | 2.03 | .0061 |
| 3 | 5 | 95 | 4.76 | [1] .094 |
| 4 | 10 | 90 | 6.62 | [1] 1.63 |
| 5 | 10 | 90 | 10.09 | .0413 |
| 6 | 12 | 88 | 11.67 | [1] .0480 |
| 7 | 14 | 86 | 13.99 | .0036 |
| 8 | 15 | 85 | 14.92 | .0013 |
| 9 | 15 | 85 | 11.55 | .0046 |
| 10 | 15 | 85 | 11.55 | .0044 |
| 11 | 18 | 82 | 17.76 | .0024 |
| 12 | 20 | 80 | 19.53 | .0024 |
| 13 | 22 | 78 | 21.83 | .0014 |
| 14 | 24 | 76 | 24.03 | .0014 |
| 15 | 26 | 74 | 25.50 | .0016 |
| 16 | 30 | 70 | 37.47 | .0013 |
| 17 | 40 | 60 | 39.81 | .0017 |
| 18 | 60 | 40 | 60.08 | .0004 |

[1] Projected wear rate based on wear rate up to point where sample was worn out.

Test II

Pressing pressure—12.5 tons per square inch.
Sintering temperature—2000° F. at 250 lbs. per square inch pressure.

[With one type of iron powder.]

| Run | Nominal Composition | | Graphite By Analysis | Wear |
|---|---|---|---|---|
| | Graphite | Iron | | |
| 1 | 1 | 99 | 1.46 | .0064 |
| 2 | 5 | 95 | 5.03 | .0442 |
| 3 | 10 | 90 | 9.53 | .0450 |
| 4 | 14 | 86 | 14.21 | .0213 |
| 5 | 20 | 80 | 20.34 | .0017 |
| 6 | 60 | 40 | 59.8 | .0004 |

Test III

Pressing pressure—12.5 tons per square inch.
Sintering Temperature—1800° F. at 250 lbs. per square inch pressure.

[With one type of iron powder.]

| Run | Nominal Composition | | Graphite By Analysis | Wear |
|---|---|---|---|---|
| | Graphite | Iron | | |
| 1 | 1 | 99 | .84 | .0006 |
| 2 | 5 | 95 | 5.22 | [1] .2800 |
| 3 | 10 | 90 | 9.89 | .0099 |
| 4 | 14 | 86 | 13.05 | .0033 |
| 5 | 20 | 80 | 20.44 | .0013 |
| 6 | 30 | 70 | 30.04 | .0083 |

[1] Projected wear rate based on wear rate up to point where sample was worn out.

The foregoing test results are shown graphically in the drawing. These tests were made on a standard Chase Brake Lining Test Machine as manufactured by Link Engineering Co., Detroit, and used commonly throughout the industry. In this device an 11 inch diameter brake drum of cast iron is mounted to be rotated in a vertical plane at selected speeds. A one-square-inch specimen of the friction material to be tested is held under predetermined dead-weight load by a specimen-holder in position against the frictional surface of the drum.

In each of the foregoing tests the specimen was held against the rotating drum under three rubbing conditions successively as follows: (A) specimen engagement against the drum on a seven second "on"–twenty-three second "off" cycle for 16 minutes at 150 p. s. i. pressure and 20 feet per second rubbing surface speed, with drum temperature maintained at approximately 100° F; (B) specimen engagement against the drum on a seven second "on"–twenty-three second "off" cycle for 16 minutes at 200 p. s. i. and 35.5 feet per second with drum temperature increased by external heating from initial temperature of approximately 100° F. to final temperature of approximately 550° F.; (C) specimen engagement against the drum on a seven second "on"–ninety second "off" cycle for 24 minutes at 150 p. s. i. and 20 feet per second with drum temperature decreased by external cooling from initial temperature of approximately 400° F. to final temperature of approximately 100° F.

Preferably, my friction assembly is constructed as follows: A friction surface such as a conventional cast iron brake drum is provided. A mating friction surface is shaped to engage the first surface under applied pressure. This second surface is composed of a pressed and sintered friction material which is made in the following manner.

Iron powder is used, preferably substantially all passing 80 mesh (U. S. Sieve Series). The carbon is graphite, preferably artificial graphite of particle size averaging 90% through 325 mesh (U. S. Sieve Series). The powdered ingredients are first measured out by weight, e.g., the iron being 75% by weight and the graphite 25% by weight. The ingredients are mixed in a blender. A compact is molded from the loose powder under a pressure of 12.5 tons per square inch. The compact is then usually assembled against a copper-plated or nickel-plated steel backing plate, and the assembly sintered at 1800° F. under pressure of 250 p. s. i.

Upon normal friction application of the two surfaces, at an applied pressure of more than about 30 p. s. i., the comminution and smearing of the graphite particles exposed on the network surface causes the formation of a substantially continuous graphitic film on the actual contact areas of one or both of the mating surfaces. It is anomalous that this film which is formed and is constantly renewed throughout the life of the article by progressive wear of the sintered iron network, and sonsequent exposure of additional graphite, actually serves to protect this network against further wear once the film has formed. The film also serves to retard "fading" at high temperature. In addition, an article made in accordance with my invention meets the other requirements of a satisfactory friction assembly in respect to proper coefficient of friction, low noise level, stability of operation, and low cost of materials and manufacture.

While I have described a particular embodiment, various modifications may obviously be made without departing from the true spirit and scope of the invention intended to be defined in the appended claims.

I claim:

1. A brake friction member comprising a metal backing and a friction facing, said facing consisting essentially of about 80 percent by weight of iron powder forming a substantially continuous sintered iron network, and the balance being substantially all graphite particles disposed in said network to generate and maintain a substantially continuous graphitic film on a friction surface of said facing upon rubbing contact with another surface under a pressure of more than about 30 pounds per square inch, said film being generated and maintained by the comminution and smearing of the graphite particles progressively exposed on said friction surface.

2. A brake friction member comprising a metal backing and a friction facing, said facing consisting essentially of a substantially continuous network of sintered iron powder, graphite particles entrapped within the pores of said network in a quantity at least 15 percent by weight of the facing to generate a continuous friction producing graphitic film on a surface of said facing during rubbing contact with an opposing surface.

3. A brake friction member comprising a metal backing and a friction facing, said facing consisting essentially of at least 15 percent by weight of graphite contained in a strong substantially continuous sintered network of iron powder and characterized by low wear of facing and opposing surface by formation of a continuous friction producing graphitic film during sliding engagement.

References Cited in the file of this patent

UNITED STATES PATENTS

| | | |
|---|---|---|
| 2,072,070 | Fisher | Feb. 23, 1937 |
| 2,301,756 | Shutt | Nov. 10, 1942 |
| 2,301,805 | Harder | Nov. 10, 1942 |
| 2,416,830 | Henberger | Mar. 4, 1947 |